(12) United States Patent
Kim et al.

(10) Patent No.: US 12,724,137 B2
(45) Date of Patent: Sep. 1, 2026

(54) ELECTRONIC DEVICE FOR DETERMINING LOCATION OF EXTERNAL ELECTRONIC DEVICE, AND OPERATION METHOD OF ELECTRONIC DEVICE

(71) Applicant: Samsung Electronics Co., Ltd., Suwon-si (KR)

(72) Inventors: Hyunchul Kim, Suwon-si (KR); Moonseok Kang, Suwon-si (KR); Yi Yang, Suwon-si (KR); Jonghoon Jang, Suwon-si (KR); Sukgi Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 18/450,120

(22) Filed: Aug. 15, 2023

(65) Prior Publication Data

US 2023/0384438 A1 Nov. 30, 2023

Related U.S. Application Data

(63) Continuation of application No. PCT/KR2021/020066, filed on Dec. 28, 2021.

(30) Foreign Application Priority Data

Feb. 17, 2021 (KR) ........................ 10-2021-0021249

(51) Int. Cl.
*G01S 13/10* (2006.01)
*G01S 7/40* (2006.01)
*G01S 13/02* (2006.01)

(52) U.S. Cl.
CPC .......... *G01S 13/103* (2013.01); *G01S 7/4021* (2013.01); *G01S 13/0209* (2013.01)

(58) Field of Classification Search
CPC ... G01S 13/103; G01S 7/4021; G01S 13/0209
See application file for complete search history.

(56) References Cited

U.S. PATENT DOCUMENTS 11,019,195 B2 5/2021 Ledvina et al.
11,576,028 B2 2/2023 Lee et al.
(Continued)

FOREIGN PATENT DOCUMENTS

CN 110794364 A 2/2020
CN 110944297 A 3/2020
(Continued)

OTHER PUBLICATIONS

International Search Report for PCT/KR2022/020066 mailed Apr. 8, 2022, 3 pages.

(Continued)

*Primary Examiner* — Marcus E Windrich
(74) *Attorney, Agent, or Firm* — Nixon & Vanderhye P.C.

(57) ABSTRACT

An electronic device may include a communication circuit configured to perform communication via an ultra-wide band (UWB) band, and a processor. The processor may be configured to determine a first distance between the electronic device and an external electronic device based on first signals exchanged while the electronic device operates in a two-way ranging mode, switch from the two-way ranging mode to a one-way ranging mode in response to determining the first distance, determine a second distance between the electronic device and the external electronic device based on the first distance and second signals received from the external electronic device while the electronic device operates in the one-way ranging mode, and switch from the one-way ranging mode to the two-way ranging mode in
(Continued)

response to determining that a specified condition related to distance between the electronic device and the external electronic device is satisfied.

14 Claims, 7 Drawing Sheets

(56) References Cited

U.S. PATENT DOCUMENTS

| | | | | |
|---|---|---|---|---|
| 11,832,256 | B2 | 11/2023 | Lee et al. | |
| 2012/0182175 | A1* | 7/2012 | Krapf | G01S 13/0209 342/118 |
| 2014/0347648 | A1* | 11/2014 | Roberts | G01S 17/06 398/118 |
| 2016/0050531 | A1* | 2/2016 | Choi | H04W 4/023 455/456.2 |
| 2016/0112839 | A1 | 4/2016 | Choi et al. | |
| 2018/0249409 | A1 | 8/2018 | Cho et al. | |
| 2020/0005566 | A1 | 1/2020 | Jain et al. | |
| 2020/0100283 | A1 | 3/2020 | Naguib et al. | |
| 2020/0106877 | A1 | 4/2020 | Ledvina et al. | |
| 2020/0137676 | A1* | 4/2020 | Yoon | H04W 4/70 |
| 2020/0228943 | A1 | 7/2020 | Aydogan et al. | |
| 2020/0272221 | A1 | 8/2020 | Foster et al. | |
| 2020/0305142 | A1 | 9/2020 | Jang et al. | |
| 2021/0014844 | A1 | 1/2021 | Lee et al. | |
| 2022/0066010 | A1* | 3/2022 | Henry | H04W 76/15 |
| 2022/0070613 | A1* | 3/2022 | Barton | G01S 5/0236 |
| 2022/0082676 | A1 | 3/2022 | Lee et al. | |

FOREIGN PATENT DOCUMENTS

| | | | |
|---|---|---|---|
| CN | 112291703 | A | 1/2021 |
| EP | 3 7647 06 | A1 | 1/2021 |
| KR | 100737811 | B1 | 7/2007 |
| KR | 20160020825 | A | 2/2016 |
| KR | 20160046340 | A | 4/2016 |
| KR | 20180001725 | A | 1/2018 |
| KR | 20180098051 | A | 9/2018 |
| KR | 20200111558 | A | 9/2020 |
| WO | 2020145526 | A1 | 7/2020 |

OTHER PUBLICATIONS

Written Opinion of the ISA for PCT/KR2022/020066 mailed Apr. 8, 2022, 3 pages.

European Extended Search Report dated Oct. 9, 2024 for EP Application No.

India Office Action dated Apr. 8, 2026 for IN Application No. 202337053854.

Korean Office Action dated Feb. 11, 2026 for KR Application No. 10-2021-0021249.

Chinese Office Action dated Jun. 8, 2026 for CN Application No. 202180093720.5.

* cited by examiner

ELECTRONIC DEVICE FOR DETERMINING LOCATION OF EXTERNAL ELECTRONIC DEVICE, AND OPERATION METHOD OF ELECTRONIC DEVICE

CROSS-REFERENCE TO RELATED APPLICATIONS

This application is a continuation of International Application No. PCT/KR2021/020066 filed on Dec. 28, 2021, designating the United States, in the Korean Intellectual Property Receiving Office, and claiming priority to KR Patent Application No. 10-2021-0021249 filed on Feb. 17, 2021, in the Korean Intellectual Property Office, the disclosures of all of which are hereby incorporated by reference herein in their entireties.

BACKGROUND

Field

Various example embodiments relate to an electronic device and/or an operation method of the electronic device, for example, to technology for determining a location of the external electronic device through a UWB communication method.

Description of Related Art

A variety of electronic devices such as smartphones, tablet PCs, portable multimedia players (PMPs), personal digital assistants (PDAs), laptop personal computers (PCs), and/or wearable devices are becoming more popular.

Technologies are being researched that utilize electronic devices that support ultra-wideband (UWB) communication. For example, technologies are being researched to measure locations of electronic devices through UWB communication between electronic devices, and to provide various services (e.g., authentication services) through the measured locations. Ultra-wideband communication can utilize a large bandwidth compared to other communication methods, and location measurement using ultra-wideband communication can have a small error compared to location measurement using GPS.

SUMMARY

An electronic device may transmit and/or receive signals with an external electronic device, while measuring a location of the external electronic device every specified interval. The electronic device may measure the location of the external electronic device on the basis of a difference between a transmission time and a reception time of signals exchanged with the external electronic device to measure the location of the external electronic device.

However, in order to measure the location of the external electronic device, power consumption may increase as the number of times signals are transmitted and/or received increases.

An electronic device and an operation method of the electronic device according to various example embodiments may use a location determination mode in which the number of times signals are transmitted and/or received is relatively small, together with a location measurement mode in which the location of the external electronic device is determined on the basis of signals exchanged between the external electronic device and the electronic device, thereby measuring a location while consuming relatively a little power.

An electronic device according to various example embodiments may include: a communication circuit for transmitting or receiving data through communication using an ultra-wideband (UWB); and a processor, wherein the processor may be configured to: check a parameter for measuring a location of an external electronic device while establishing the communication for measuring the location of the external electronic device; operate in a first location determination mode for determining, on the basis of the parameter, a location of the external electronic device on the basis of first signals exchanged between the external electronic device and the electronic device; in response to determining the location of the external electronic device, switch to a second location determination mode for determining a location of the external electronic device on the basis of a second signal transmitted by the external electronic device; and in response to satisfying a specified condition related to the location of the external electronic device, switch from the second location determination mode to the first location determination mode.

An operation method of an electronic device according to various example embodiments, where the operation method may include: checking a parameter for measuring a location of an external electronic device while establishing communication for measuring the location of the external electronic device; determining a location of the external electronic device, on the basis of the parameter, while operating in a first location determination mode for determining a location of the external electronic device on the basis of first signals exchanged between the external electronic device and the electronic device; switching to a second location determination mode for determining a location of the external electronic device on the basis of a second signal transmitted by the external electronic device, and updating the location of the external electronic device; and switching from the second location determination mode to the first location determination mode in response to satisfying a specified condition related to the location of the external electronic device.

The electronic device and/or the operation method of the electronic device according to various example embodiments may determine the location of the external electronic device in a manner that repeatedly uses the first location determination mode to determine the location of the external electronic device on the basis of signals exchanged between the external electronic device and the electronic device, and the second location determination mode to determine the location of the external electronic device on the basis of signals transmitted by the external electronic device. The electronic device and/or the operation method of the electronic device may reduce power consumption at least by using the second location determination mode that consumes relatively less power.

The electronic device and/or the operation method of the electronic device according to various example embodiments may determine the location of the external electronic device on the basis of signals exchanged between the external electronic device and the electronic device, and may check the amount of change in the location of the external electronic device on the basis of a signal transmitted by the external electronic device. The electronic device and the operation method of the electronic device may determine (or update) the location of the external electronic device on the basis of the amount of change in the location and the determined location, thereby determining the location of the external electronic device.

BRIEF DESCRIPTION OF DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
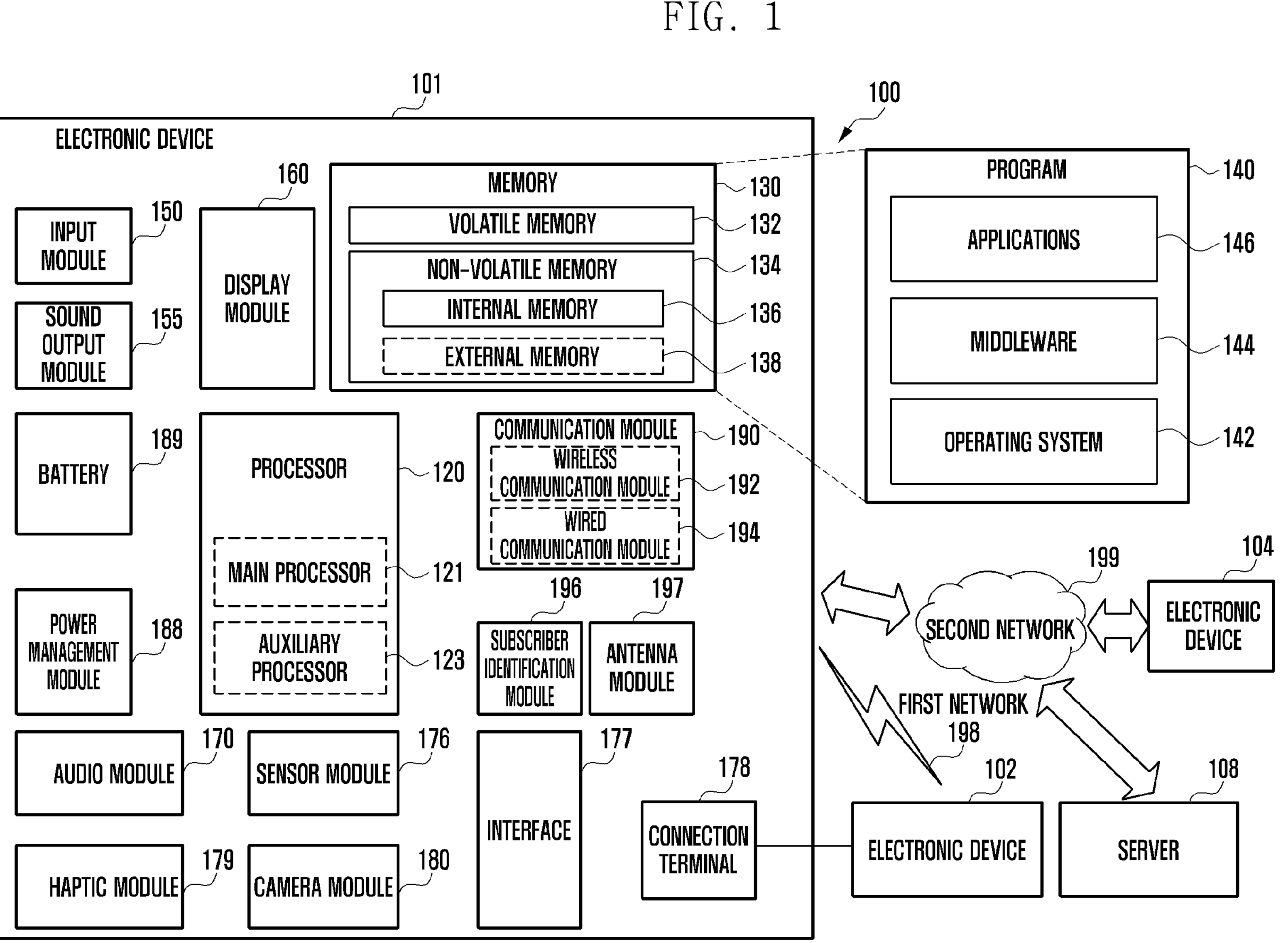
FIG. 1 is a block diagram illustrating an electronic device, according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting/connection terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
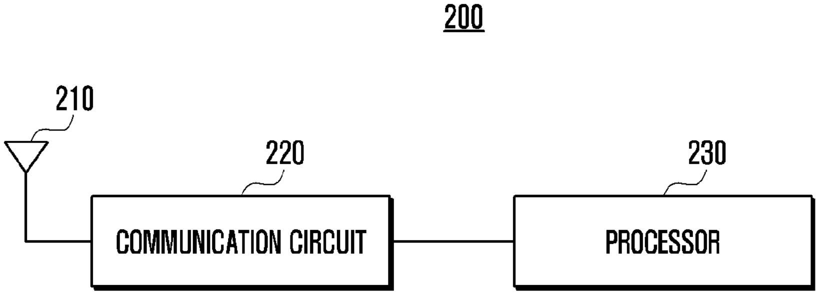
FIG. 2 is a block diagram of the electronic device according to various example embodiments.

FIG. 2 is a block diagram of the electronic device according to various example embodiments.

With reference to FIG. 2, an electronic device 200 (e.g., the electronic device 101 in FIG. 1) according to various example embodiments may include an antenna 210 (e.g., the antenna module 197 in FIG. 1), communication circuit 220 (e.g., the communication module 190 in FIG. 1, comprising communication circuitry), and/or a processor 230 (e.g., the processor 120 in FIG. 1).

According to various example embodiments, the antenna 210 may transmit and/or receive signals using a specific communication standard. The specific communication standard may include, for example, ultra-wideband (UWB) communication. UWB may indicate a variety of communication methods that utilize a wide range of frequency bands (e.g., frequency bands in 3.1 GHz to 10 GHz band) to transmit information compared to other communication methods.

According to various example embodiments, the communication circuit 220 is electrically connected, directly or indirectly, to the processor 230 and may transmit signals received through the antenna 210 to the processor 230. The communication circuit 220 is electrically connected to the antenna 210 and may transmit signals to the antenna 210 that include data to be transmitted through UWB communication.

According to various example embodiments, the processor 230 may be at least one of a communication processor (e.g., the auxiliary processor 123 in FIG. 1) or an application processor (e.g., the main processor 121 in FIG. 1). The processor 230 may determine a location of an external electronic device (e.g., the electronic device 104 in FIG. 1) through UWB communication using signals output from the antenna 210 and/or signals received from the antenna 210 through UWB communication method.

According to various example embodiments, the processor 230 may establish a UWB communication connection with the external electronic device 104. The processor 230 may, during the establishment operation, exchange a UWB parameter for the UWB communication connection with the external electronic device 104. In an embodiment, the processor 230 may exchange the UWB parameter through UWB communication or other communication methods (out of band, OOB) (e.g., short-range communication methods including Bluetooth, Wi-Fi). The UWB parameter may include information on a location measurement interval (e.g., ranging interval) between the electronic device 200 and the external electronic device 101.

According to various example embodiments, the processor 230 may perform an operation to determine a location of the external electronic device 104 in response to completing the UWB communication connection.

According to various example embodiments, a method of determining the location of the external electronic device 104 may include a first location determination mode (e.g., two-way ranging) in which the location of the external electronic device 104 may be determined on the basis of a first signal exchanged between the external electronic device 104 and the electronic device 200 and/or a second location determination mode (e.g., one-way ranging) in which the location of the external electronic device 104 may be determined on the basis of a second signal transmitted by the external electronic device 104 to the electronic device 200. The second location determination mode may indicate a mode for determining the location of the external electronic device 104 on the basis of a previously determined location of the external electronic device 104 and an amount of change in the location of the external electronic device 104 determined on the basis of the second signal.

According to various example embodiments, the processor 230 may, in the first location determination mode, control the communication circuit 220 to transmit a control message to the external electronic device 104 and/or receive the control message from the external electronic device 104. The processor 230 may check a parameter for measuring the location of the external electronic device 104 that is present within the control message. The parameter for determining the location of the external electronic device 104 are a parameter that is required to control the operation for determining the location of the external electronic device 104, and the parameter may include, in the first location determination mode, a period of the first signal exchanged (e.g., a slot duration indicating an interval between the first signals).

According to various example embodiments, the processor 230 may, after receiving the control message, receive a ranging initiation message from the external electronic device 104 for determining the location of the external electronic device 104. The external electronic device 104 may store a transmission time (e.g., $T_1$) of the ranging initiation message and transmit the ranging initiation message to the electronic device 104. The processor 230, in response to receiving the ranging initiation message, may store a time (e.g., $T_2$) at which the ranging initiation message was received. The processor 230 may transmit a response message (e.g., a ranging response message) to the received ranging initiation message signal to the external electronic device 104. The processor 230 may store a time (e.g., $T_3$) at which the response message was transmitted. The external electronic device 104 may, in response to receiving the response message, store a time of receiving the response message (e.g., $T_4$) and transmit a measurement report message to the electronic device 104. The measurement report message may include the transmission time $T_1$ of the ranging initiation message and the reception time $T_4$ of the response message. The processor 230 may receive the measurement report message and determine a location between the external electronic device 104 and the electronic device 200 on the basis of the measurement report message. For example, the processor 230 may determine a distance between the external electronic device 104 and the electronic device 200 on the basis of the transmission time $T_1$ of the ranging initiation message, the reception time $T_2$ of the ranging initiation message, the transmission time $T_3$ of the response message, and/or the reception time $T_4$ of the response message. The processor 230 may determine the distance between the external electronic device 104 and the electronic device 200, based on Equation 1 below. Equation 1 may be an equation that calculates an average travel distance of the first signal (e.g., the ranging initiation message or the response message), which is a set of signals exchanged in a first operation mode.

$$\text{Distance} = D\frac{(T_4 - T_1) - (T_3 - T_2)}{2} * c, \quad \text{[Equation 1]}$$

$$c = 3 * 10^8 \text{ m/s (Speed of first signal)}$$

According to various example embodiments, processor 230 may, after receiving the control message, receive the ranging initiation message from the external electronic device 104 for determining the location of the external electronic device 104. The external electronic device 104 may store a transmission time (e.g., $T_1$) of the ranging initiation message and transmit the ranging initiation message to the electronic device 200. The processor 230, in response to receiving the ranging initiation message, may store a time (e.g., $T_2$) at which the ranging initiation message was received. The processor 230 may transmit a response message (e.g., a ranging response message) to the received ranging initiation message signal to the external electronic device 104. The processor 230 may store a time (e.g., $T_3$) at which the response message was transmitted. The external electronic device 104 may, in response to receiving the response message, store a time of receiving the response message (e.g., $T_4$) and transmit a final message. The external electronic device 104 may store a time (e.g., $T_5$) at which the final message was transmitted. The processor 230 may receive the final message and store a time (e.g., $T_6$) at which the final message was received. The processor 230 may receive the measurement report message from the external electronic device 104. The measurement report message may include the transmission time $T_1$ of the ranging initiation message, the reception time $T_4$ of the response message, and/or the transmission time $T_5$ of the final message. The processor 230 may receive the measurement report message and determine a location between the external electronic device 104 and the electronic device 101/200 on the basis of the measurement report message. For example, the processor 230 may determine the distance between the external electronic device 104 and the electronic device 101/200 on the basis of the transmission time $T_1$ of the ranging initiation message, the reception time $T_2$ of the ranging initiation message, the transmission time $T_3$ of the response message, the reception time $T_4$ of the response message, the transmission time $T_5$ of the final message, and/or the reception time $T_6$ of the final message. The processor 230 may determine the distance between the external electronic device 104 and the electronic device 200, based on Equation 2 below. Equation 2 may be an equation for calculating an average travel distance of the first signal (e.g., the ranging initiation message, the response message, or the final message), which is a set of signals exchanged in the first operation mode.

$$\text{Distance} = \frac{(T_4 - T_1) - (T_3 - T_2) + (T_6 - T_3) - (T_5 - T_4)}{4} * c, \ c = 3 * 10^8 \text{ m/s (Speed of first signal)} \quad \text{[Equation 2]}$$

With reference to the previously described embodiments, the location of the external electronic device 104 is described as being determined on the basis of the transmission time and the reception time of the first signals exchanged between the external electronic device 104 and the electronic device 200 (e.g., the ranging initiation message, the ranging response message, or the final message), but may also be determined on the basis of variables related to time (e.g., a sequence of time stamps) rather than time. The electronic device 200 and the external electronic device 104 may assign a specified order, in a specified unit of time (e.g., 15.65 ps, time stamp), to the received or transmitted signals. The electronic device 200 may determine the location of the external electronic device 104, on the basis of the assigned order.

With reference to the previously described embodiments, the processor 230 may, in the first location determination mode, determine the location between the external electronic device 104 and the electronic device 200 on the basis of the transmission time of the first signals exchanged with the external electronic device 104 (e.g., the ranging initiation message, the ranging response message, or the final message) and the reception time of the first signals. The first signals may be exchanged according to a specified interval included in the UWB parameter. For example, the control message may be received by the external electronic device 104 at a specified interval (e.g., one second), or may be transmitted by the external electronic device 104. The electronic device 200 and the external electronic device 104 may, in the first operation mode, increase power consumption due to the transmission of the first signals, the reception of the first signals, and/or the processing of the first signals as the number of first signals exchanged increases. In addition, in the first operation mode, the electronic device 200 (e.g., the electronic device 101 of FIG. 1) receiving the first signal may consume more power than the external electronic device 104 transmitting the first signal, in consideration of an operation of processing the first signal, an operation of keeping the communication circuit 220 active to wait for receiving the first signal, and a situation of having a plurality of antennas to receive the first signal. In another example, the external electronic device 104 may experience problems due to the power that the external electronic device 104 consumes in the first mode of operation in case that the external electronic device 104 includes a battery with a relatively small capacity.

Hereinafter, embodiments of measuring the location of the external electronic device 104 that consumes relatively small amounts of power are described.

According to various example embodiments, the processor 230 may exchange a parameter for the UWB communication connection with the external electronic device 104 during the establishment of the UWB communication connection with the external electronic device 104. The processor 230 may exchange the parameter through UWB communication or other communication methods (out of band, OOB) (e.g., short-range communication methods including Bluetooth, Wi-Fi). For example, the parameter may include information indicating whether the first location determination mode and the second location determination mode are operated, the number of times the second location determination mode is operated, and information on conditions for switching from the second location determination mode to the first location determination mode.

According to various example embodiments, the processor 230 may determine the location of the external electronic device 104 on the basis of the first signals, in the first location determination mode, after the UWB communication connection is completed. In an embodiment, the processor 230 may switch from the first location determination mode to the second location determination mode in response to determining the location of the external electronic device 104. In another example, the external electronic device 104 may switch to the second location determination mode after a specified time (e.g., ranging interval) included in the UWB parameter. According to various example embodiments, the second location determination mode may be a location determination mode in which the location of the external electronic device 104 may be determined on the basis of the second signal transmitted by the external electronic device 104 to the electronic device 200. The second location determination mode may be a mode in which the external electronic device 104 transmits the second signal every specified time and the electronic device 200 may not transmit a separate signal from the external electronic device 104. Since the number of signals transmitted and/or received is smaller than in the first location determination mode, a smaller power consumption than in the first location determination mode may be implemented.

According to various example embodiments, the external electronic device 104 may transmit the second signal (e.g., a blink message) every specified time (e.g., a ranging interval included in the UWB parameter) and for the specified number of times (e.g., the number of iterations of the second location determination mode included in the UWB parameter) after the first location determination mode ends. The processor 230 may receive the second signal transmitted by the external electronic device 104, and check the reception time of the second signal. The processor 230 may determine the location of the external electronic device 104, on the basis of the specified time and the reception time of the second signal.

According to an embodiment, the processor 230 may check a time stamp of the first signal received in the first location determination mode and a time stamp of the second signal received in the second location determination mode. The processor 230 may check an amount of change in location between the electronic device 200 and the external electronic device 104 on the basis of a difference in the time stamp of the first signal and the time stamp of the second signal. The amount of change in location may be determined using Equation 3 below.

[Equation 3]

$$\text{Amount of change in location} = s*\left[TS_{Blink}-\left(TS_{control}+N_{blink}*\frac{\text{ranging interval}}{RCTU}\right)\right]$$

($TS_{Blink}$: time stamp number of second signal, $TS_{control}$: time stamp number of first signal, $N_{blink}$: number of times second signal is received, ranging interval: specified transmission time of second signal, RCTU: time unit of time stamp, s: travel distance of second signal during time unit of time stamp)

According to various example embodiments, the processor 230 may determine (or update) the location of the external electronic device 104 in the second location determination mode on the basis of the amount of change in location and the location of the external electronic device 104 determined in the first location determination mode. Upon receiving the second signal every specified number of times, the processor 230 may determine (or update) the location of the external electronic device 104 in the manner described above.

According to various example embodiments, the processor 230 may utilize the location of the external electronic device 104 determined in the first location determination mode for determining the location of the external electronic device 104 in the second location determination mode. In an embodiment, the processor 230 may perform the operation of determining the location of the external electronic device 104 in the first location determination mode without performing a switch from the first location determination mode to the second location determination mode when the processor 230 is unable to determine the location of the external electronic device 104 in the first location determination mode.

According to various example embodiments, the processor 230 may switch from the second location determination mode to the first location determination mode in response to satisfying a condition related to the location of the external electronic device 104.

According to an embodiment, the processor 230 may switch from the second location determination mode to the first location determination mode in response to receiving the second signal a specified number of times or more. In an embodiment, the processor 230 may, in response to switching to the first location determination mode, transmit a message indicating the switch to the first location determination mode to the external electronic device 104.

According to an embodiment, the processor 230 may check the amount of change in the location of the external electronic device 104 while operating in the second mode of operation. The processor 230 may switch from the second location determination mode to the first location determination mode in response to checking that the amount of change in the location of the external electronic device 104 is greater than or equal to a specified value. The processor 230 may, in response to switching to the first location determination mode, transmit a message indicating the switch to the first location determination mode to the external electronic device 104.

According to an embodiment, the processor 230 may check the amount of change in the location of the external electronic device 104 while operating in the second mode of operation. The processor 230 may switch from the second location determination mode to the first location determination mode in response to checking that a distance between the electronic device 200 and the external electronic device 104 is greater than or equal to a specified value. The processor 230 may, in response to switching to the first location determination mode, transmit a message indicating the switch to the first location determination mode to the external electronic device 104.

According to various example embodiments, the processor 230 may check a parameter that may be obtained during the establishment of the UWB communication or in a step of exchanging the control message of the first operation mode, and may check information on a condition for switching from the second operation mode within the parameter to the first operation mode. The processor 230 may configure a condition related to a switch from the second operating mode to the first operating mode, on the basis of information on the condition of the switch from the second operating mode to the first operating mode. In an embodiment, the processor 230 may transmit information directing the switch from the second operation mode to the first operation mode to the external electronic device 104 through various communication methods established between the electronic device 200 and the external electronic device 104 (e.g., UWB communication, or OOB communication other than UWB communication (Wi-Fi, Bluetooth)) in response to the location of the external electronic device 104 satisfying a specified condition.

Figure 3A:
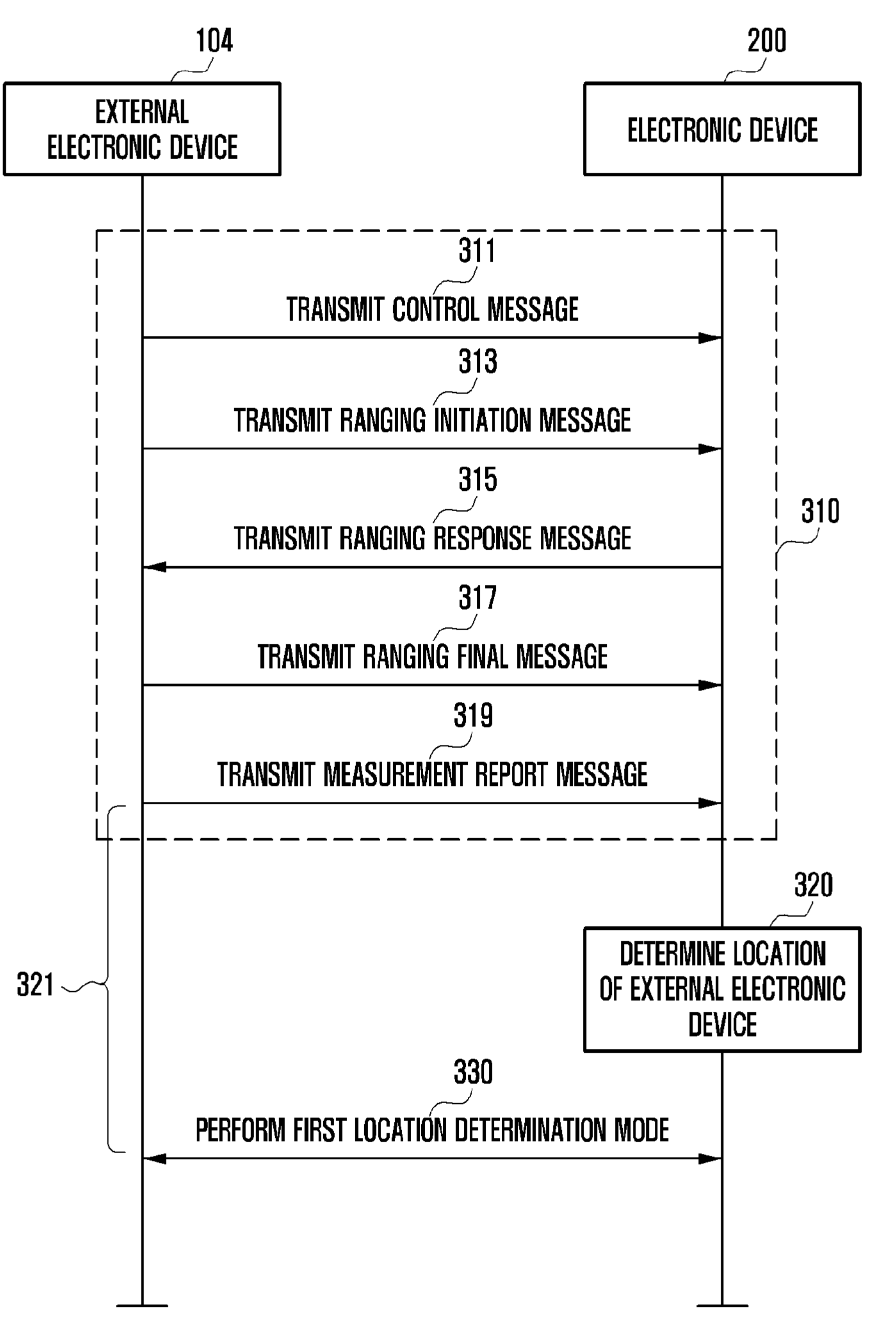
FIG. 3A is a view illustrating an embodiment of determining a location of an external electronic device using a first location determination mode in the electronic device according to various example embodiments.

FIG. 3A is a view illustrating an embodiment of determining a location of an external electronic device using a first location determination mode in the electronic device according to various example embodiments.

According to various example embodiments, the electronic device 200 (e.g., the electronic device 200 in FIG. 2) may perform the UWB connection with the external electronic device 104 (e.g., the external electronic device 104 in FIG. 1) to measure the location of the external electronic device 104. While performing the UWB connection, the electronic device 200 may check a parameter that includes a location measurement interval 321, 322, and 323 between the electronic device 200 and the external electronic device 104.

According to various example embodiments, the electronic device 200 may, while performing the UWB connection, exchange the UWB parameter through communication methods other than UWB communication (out of band, OOB) (e.g., short-range communication methods including Bluetooth, Wi-Fi). The electronic device 200 may exchange the UWB parameter through another communication method (OOB) connected between the external electronic device 104 and the electronic device 200.

According to various example embodiments, the electronic device 200 may determine the location of the external electronic device, while operating in the first location determination mode every specified location measurement interval.

According to various example embodiments, in operation 310, the electronic device 200 may determine the location of the external electronic device 104, while operating in the first location determination mode.

According to various example embodiments, in operation 311, the electronic device 200 may receive the control message from the external electronic device 104.

According to various example embodiments, the electronic device 200 may check a parameter for determining the location of the external electronic device 104 that is present in the control message. The parameter for determining the location of the external electronic device 104 are, for example, a parameter that is required to control the operation for determining the location of the external electronic device 104, and the parameter may include, in the first location determination mode, a period of the first signal exchanged (e.g., a slot duration indicating an interval between the first signals). The electronic device 200 and the external electronic message, the ranging final message, and/or the measurement report message, depending on the period of the first signal.

According to various example embodiments, the electronic device 200 may also receive the control message through a communication method other than UWB communication (e.g., Bluetooth).

According to various example embodiments, in operation 313, the external electronic device 104 may transmit the ranging initiation message (or, polling message) to the electronic device 200 for determining the location of the external electronic device 104.

The external electronic device 104 may store a transmission time (e.g., $T_1$) of the ranging initiation message and transmit the ranging initiation message to the electronic device 200. The electronic device 200, in response to receiving the ranging initiation message, may store a time (e.g., $T_2$) at which the ranging initiation message was received. According to another embodiment, the external electronic device 104 may transmit the ranging initiation message including the transmission time (e.g., $T_1$) of the ranging initiation message to the electronic device 200. The transmission time of the ranging initiation message may be transmitted to the electronic device 200, depending on a configuration of the electronic device 200 and the external electronic device 104.

According to various example embodiments, in operation 315, the electronic device 200 may transmit the ranging response message to the external electronic device 104 in response to receiving the ranging initiation message.

According to various example embodiments, the electronic device 200 may transmit the ranging response message and store the time (e.g., $T_3$) at which the ranging response message was transmitted.

According to various example embodiments, in operation 317, the external electronic device 104 may transmit the ranging final message to the electronic device 200 in response to receiving the ranging response message.

According to various example embodiments, the external electronic device 104 may store the time (e.g., $T_5$) at which the ranging final message was transmitted while transmitting the ranging final message.

According to various example embodiments, the electronic device 200 may store the time (e.g., $T_6$) at which the ranging final message was received while receiving the ranging final message.

According to various example embodiments, in operation 317, the external electronic device 104 may transmit the ranging final message and, after a specified time (e.g., slot duration), transmit the measurement report message 319 to the electronic device 200.

According to various example embodiments, the measurement report message may include a round trip time RTT indicating a difference value between the reception time $T_4$ of the response message and the transmission time $T_1$ of the ranging initiation message, and a reply time indicating a difference value between the transmission time $T_5$ of the final message and/or the reception time $T_4$ of the response message. In another example, the measurement report message may include the transmission time $T_1$ of the ranging initiation message, the reception time $T_4$ of the response message, and/or the transmission time $T_5$ of the final message.

According to various example embodiments, the electronic device 200 may, in operation 320, determine the location between the external electronic device 104 and the electronic device 101 on the basis of the measurement report message. For example, the electronic device 200 may determine the distance between the external electronic device 104 and the electronic device 200 on the basis of a round-trip time and a response time included in the measurement report message. In another example, the electronic device 200 may determine the distance between the external electronic device 104 and the electronic device 200 on the basis of the transmission time $T_1$ of the ranging initiation message, the reception time $T_2$ of the ranging initiation message, the transmission time $T_3$ of the ranging response message, the reception time $T_4$ of the ranging response message, the transmission time $T_5$ of the ranging final message, and/or the reception time $T_6$ of the ranging final message. In an embodiment, the electronic device 200 may determine the distance between the external electronic device 104 and the electronic device 200, on the basis of Equation 2 described above. Equation 2 may be an equation for calculating an average travel distance of the first signal (e.g., the ranging initiation message, the response message, or the final message), which is a set of signals exchanged in the first operation mode.

According to various example embodiments, the electronic device 200 and the external electronic device 104 may omit some of the operations 311, 313, 315, 317, or 319, depending on the location determination method configured through the UWB connection. According to an embodiment, the electronic device 200 and the external electronic device 104, when configured in a deferred mode and determining the location of the external electronic device 104 using double sided two way ranging (DS-TWR), may perform all of operations 311, 313, 315, 317, or 319 to determine the location of the external electronic device 104. According to another embodiment, the electronic device 200 and the external electronic device 104, when configured in the deferred mode and determining the location of the external electronic device 104 using single sided two way ranging (SS-TWR), may perform operation 311, 313, 315, or 319 to determine the location of the external electronic device 104. According to another embodiment, the electronic device 200 and the external electronic device 104 may perform operation 311, 313, 315, or 317 as the electronic device 200 and the external electronic device 104 are configured in a non-deferred mode (a mode in which time stamp information corresponding to the measured time is included in the ranging message (e.g., the control message, the ranging initiation message, the ranging response message, and/or the ranging final message) and transmitted.)

According to various example embodiments, the electronic device 200 may operate in the first location determination mode, in operation 330, after the first location determination mode is performed (operation 310) and in response to a lapse in the location measurement interval 321. The electronic device 200 may determine the location of the external electronic device 104, while performing substantially the same operation as operations 311 to 320.

Figure 3B:
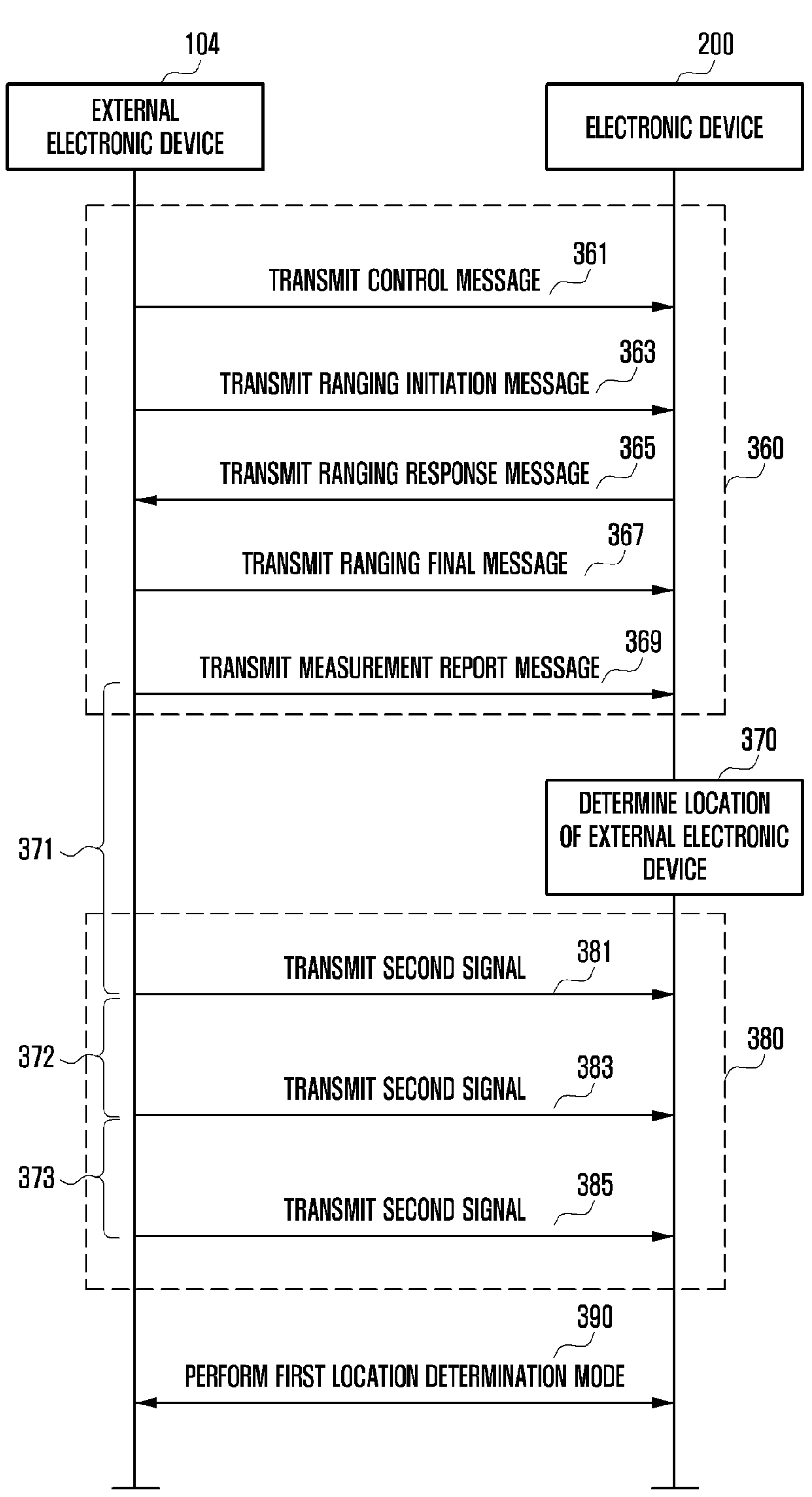
FIG. 3B is a view illustrating an embodiment of determining a location of the external electronic device using the first location determination mode and a second location determination mode in the electronic device according to various example embodiments.

FIG. 3B is a view illustrating an embodiment of determining a location of the external electronic device using the first location determination mode and a second location determination mode in the electronic device according to various example embodiments.

According to various example embodiments, the electronic device 200 (e.g., the electronic device 200 in FIG. 2) may perform the UWB connection with the external electronic device 104 (e.g., the external electronic device 104 in FIG. 1) to measure the location of the external electronic device 104. While performing the UWB connection, the electronic device 200 may check a parameter that includes a location measurement interval 321, 322, and 323 between the electronic device 200 and the external electronic device 104.

According to various example embodiments, the electronic device 200 may, while performing the UWB connection, exchange the UWB parameter through communication methods other than UWB communication (out of band, OOB) (e.g., short-range communication methods including Bluetooth, Wi-Fi). The electronic device 200 may exchange the UWB parameter through another communication method (OOB) connected between the external electronic device 104 and the electronic device 200.

According to various example embodiments, the electronic device 200 may determine the location of the external electronic device 104, while operating in the first location determination mode every specified location measurement interval.

According to various example embodiments, in operation 360, the electronic device 200 may measure the location of the external electronic device 104, while operating in the first location determination mode.

According to various example embodiments, in operation 361, the electronic device 200 may receive the control message from the external electronic device 104.

According to various example embodiments, the electronic device 200 may check a parameter for determining the location of the external electronic device 104 that is present in the control message. The parameter for determining the location of the external electronic device 104 are, for example, a parameter that is required to control the operation for determining the location of the external electronic device 104, and the parameter may include, in the first location determination mode, a period of the first signal exchanged (e.g., a slot duration indicating an interval between the first signals). The electronic device 200 and the external electronic message, the ranging final message, and/or the measurement report message, depending on the period of the first signal.

According to various example embodiments, the parameter may include information indicating whether the first location determination mode and the second location determination mode are operated, the number of times the second location determination mode is operated, and information on conditions for switching from the second location determination mode to the first location determination mode.

According to various example embodiments, in operation 363, the external electronic device 104 may transmit the ranging initiation message to the electronic device 200 for determining the location of the external electronic device 104.

The external electronic device 104 may store a transmission time (e.g., $T_1$) of the ranging initiation message and transmit the ranging initiation message to the electronic device 104. According to another embodiment, the external electronic device 104 may transmit the ranging initiation message including the transmission time (e.g., $T_1$) of the ranging initiation message to the electronic device 200. The transmission time of the ranging initiation message may be transmitted to the electronic device 200, depending on a configuration of the electronic device 200 and the external electronic device 104. The electronic device 200, in response to receiving the ranging initiation message, may store a time (e.g., $T_2$) at which the ranging initiation message was received.

According to various example embodiments, in operation 365, the electronic device 200 may transmit the ranging response message to the external electronic device 104 in response to receiving the ranging initiation message.

According to various example embodiments, the electronic device 200 may transmit the ranging response message and store the time (e.g., $T_3$) at which the ranging response message was transmitted.

According to various example embodiments, in operation 367, the external electronic device 104 may transmit the ranging final message to the electronic device 200 in response to receiving the ranging response message.

According to various example embodiments, the external electronic device 104 may store the time (e.g., $T_5$) at which the ranging final message was transmitted while transmitting the ranging final message.

According to various example embodiments, the electronic device 200 may store the time (e.g., $T_6$) at which the ranging final message was received while receiving the ranging final message.

According to various example embodiments, in operation 367, the external electronic device 104 may transmit the ranging final message and, after a specified time (e.g., slot duration), in operation 369 transmit the measurement report message to the electronic device 200.

According to various example embodiments, the measurement report message may include a round trip time RTT indicating a difference value between the reception time $T_4$ of the response message and the transmission time $T_1$ of the ranging initiation message, and a reply time indicating a difference value between the transmission time $T_5$ of the final message and the reception time $T_4$ of the response message. In another example, the measurement report message may include the transmission time $T_1$ of the ranging initiation message, the reception time $T_4$ of the response message, and the transmission time $T_5$ of the final message.

According to various example embodiments, the electronic device 200 may, in operation 370, determine the location between the external electronic device 104 and the electronic device 200 on the basis of the measurement report message. For example, the electronic device 200 may determine the distance between the external electronic device 104 and the electronic device 200 on the basis of a round-trip time and a response time included in the measurement report message. In another example, the electronic device 200 may determine the distance between the external electronic device 104 and the electronic device 200 on the basis of the transmission time $T_1$ of the ranging initiation message, the reception time $T_2$ of the ranging initiation message, the transmission time $T_3$ of the ranging response message, the reception time $T_4$ of the ranging response message, the transmission time $T_5$ of the ranging final message, and/or the reception time $T_6$ of the ranging final message. The electronic device 200 may determine the distance between the external electronic device 104 and the electronic device 200, on the basis of Equation 2 described above. Equation 2 may be an equation for calculating an average travel distance of the first signal (e.g., the ranging initiation message, the response message, or the final message), which is a set of signals exchanged in the first operation mode.

According to various example embodiments, the electronic device 200 may switch from the first location determination mode to the second location determination mode in response to determining the location of the external electronic device 104. The second location determination mode may indicate a mode for determining the location of the external electronic device 104 on the basis of the location of the external electronic device 104 determined in the first location determination mode and an amount of change in the location of the external electronic device 104 determined on the basis of the second signal.

In an embodiment, the external electronic device 104 may switch to the second location determination mode after a specified time (e.g., ranging interval) included in the UWB parameter. The external electronic device 104 may transmit the second signal (e.g., a blink message) every specified time (e.g., a ranging interval included in the UWB parameter) and for the specified number of times (e.g., the number of iterations of the second location determination mode included in the UWB parameter) after the first location determination mode ends. According to an embodiment, the second signal may include a blink message. The second signal may indicate, in the second location measurement mode, a signal that the external electronic device 104 transmits to the electronic device 200 for determining the location of the external electronic device 104. The second signal may include time stamp information corresponding to the time at which the external electronic device 104 transmitted a signal. A configuration related to the transmission of the second signal (e.g., a specified time related to a transmission period of the second signal and/or a specified number of times related to the transmission of the second signal) may be configured in the process of configuring the UWB connection between the electronic device 200 and the external electronic device 104, prior to operation 360.

According to various example embodiments, in operation 380, the electronic device 200 may, in the second operation mode, determine the location of the external electronic device 104 on the basis of the second signal.

According to various example embodiments, in operation 381, the external electronic device 104 may transmit the second signal to the electronic device 200 after a specified time period 371.

According to various example embodiments, the electronic device 200 may receive the second signal transmitted by the external electronic device 104. The electronic device 200 may check a reception time of the second signal. The electronic device 200 may determine the location of the external electronic device 104, on the basis of the specified time and the reception time of the second signal.

According to an embodiment, the electronic device 200 may check a time stamp of the first signal received in the first location determination mode (e.g., the control message received in operation 361) and a time stamp of the second signal received in the second location determination mode. The processor 230 may check an amount of change in location between the electronic device 200 and the external electronic device 104 on the basis of a difference in the time stamp of the first signal and the time stamp of the second signal.

According to various example embodiments, the electronic device 200 may determine (or update) the location of the external electronic device 104 in the second location determination mode on the basis of the amount of change in location and the location of the external electronic device 104 determined in the first location determination mode.

According to an embodiment, upon receiving the second signal every specified number of times, the electronic device 200 may determine (or update) the location of the external electronic device 104 in the manner described above.

According to various example embodiments, in operation 383, the external electronic device 104 may transmit the second signal to the electronic device 200 after a specified time period 372.

The electronic device 200 may receive the second signal and determine the location of the external electronic device 104 on the basis of the second signal.

According to various example embodiments, in operation 385, the external electronic device 104 may transmit the second signal to the electronic device 200 after a specified time period 373.

The electronic device 200 may receive the second signal and determine the location of the external electronic device 104 on the basis of the second signal.

According to various example embodiments, the electronic device 200 may switch from the second location determination mode to the first location determination mode in response to satisfying a specified condition related to the reception of the second signal. In an embodiment, the electronic device 200 may switch from the second location determination mode to the first location determination mode in response to receiving the second signal a specified number of times or more. In another embodiment, the electronic device 200 may switch from the second location determination mode to the first location determination mode in response to an amount of change in the location of the external electronic device 104 determined in the second location determination mode being greater than or equal to a specified value. In another embodiment, the electronic device 200 may switch from the second location determination mode to the first location determination mode in response to a distance between the location of the external electronic device 104 and the location of the electronic device 200 determined in the second location determination mode being greater than or equal to a specified distance. The electronic device 200 may, in response to switching to the first location determination mode, transmit a message indicating the switch to the first location determination mode to the external electronic device 104.

According to various example embodiments, the electronic device 200 may operate in the first location determination mode, in operation 390. The electronic device 200 may determine the location of the external electronic device 104, while performing substantially the same operation as operations 361 to 369.

With reference to the embodiment shown in FIG. 3B, the electronic device 200 may operate in the first location determination mode, determine the location of the external electronic device 104, and then operate in the second location determination mode.

According to various example embodiments, the second location determination mode may be a mode in which the external electronic device 104 transmits the second signal every specified time and the electronic device 200 may not transmit a separate signal from the external electronic device 104. Since the number of signals transmitted and/or received is smaller than in the first location determination mode, it is possible to operate with a smaller power consumption than in the first location determination mode. Therefore, the electronic device 200 with the embodiment illustrated in FIG. 3B may consume less power compared to the electronic device with the embodiment illustrated in FIG. 3A.

Figure 4:
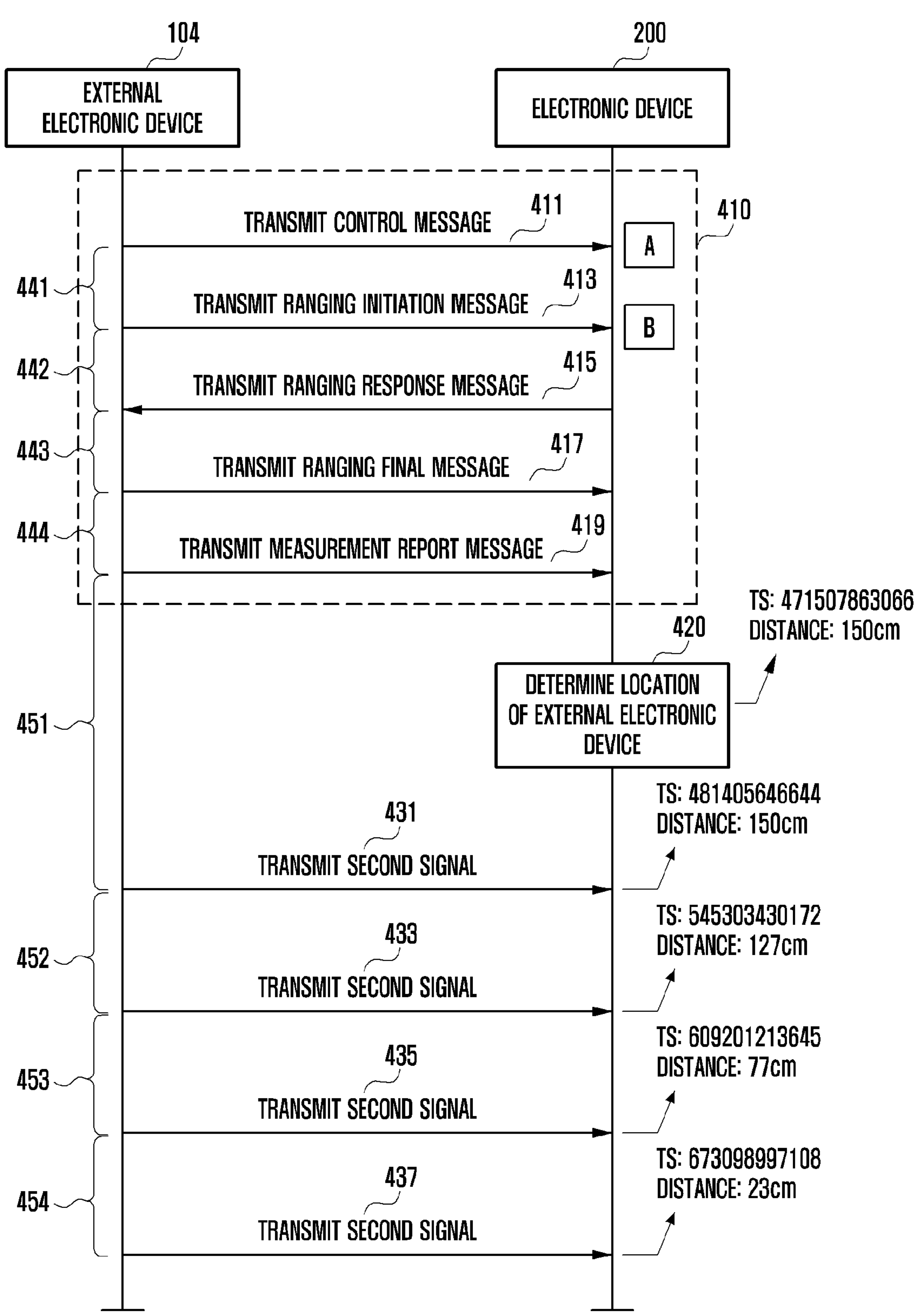
FIG. 4 is a view illustrating an embodiment of determining a location of the external electronic device, in the second location determination mode, in the electronic device, according to various example embodiments.

FIG. 4 is a view illustrating an embodiment of determining a location of the external electronic device, in the second location determination mode, in the electronic device, according to various example embodiments.

According to various example embodiments, the electronic device 200 (e.g., the electronic device 200 in FIG. 2) may perform the UWB connection with the external electronic device 104 (e.g., the external electronic device 104 in FIG. 1) to measure the location of the external electronic device 104. While performing the UWB connection, the electronic device 200 may check a parameter that includes a location measurement interval 451, 452, 453, and 454 (e.g., one second) between the electronic device 200 and the external electronic device 104.

According to various example embodiments, the electronic device 200 may performing the UWB connection, exchange the UWB parameter through communication methods other than UWB communication (out of band, OOB) (e.g., short-range communication methods including Bluetooth, Wi-Fi). The electronic device 200 may exchange the UWB parameter through another communication method (OOB) connected between the external electronic device 104 and the electronic device 200.

According to various example embodiments, the electronic device 200 may determine the location of an external electronic device, while operating in the first location determination mode or the second location determination mode, every specified location measurement interval 451, 452, 453, and 454 (e.g., 1 ms).

According to various example embodiments, in operation 410, the electronic device 200 may measure the location of the external electronic device 104, while operating in the first location determination mode.

According to various example embodiments, in operation 411, the electronic device 200 may receive the control message from the external electronic device 104.

According to various example embodiments, the electronic device 200 may check a parameter for determining the location of the external electronic device 104 that is present in the control message. The parameter for determining the location of the external electronic device 104 are, for example, a parameter that is required to control the operation for determining the location of the external electronic device 104, and the parameter may include, in the first location determination mode, a period of the first signal exchanged 441, 442, 443, and 444 (e.g., a slot duration indicating an interval between the first signals). In an embodiment, the electronic device 200 and the external electronic device 104 may transmit the ranging initiation message, the ranging response message, the ranging final message, and/or the measurement report message, depending on the period of the first signal.

According to various example embodiments, the parameter may include information indicating whether the first location determination mode and the second location determination mode are operated, the number of times the second location determination mode is operated, and information on conditions for switching from the second location determination mode to the first location determination mode.

According to various example embodiments, in operation 413, the external electronic device 104 may transmit the ranging initiation message to the electronic device 200 for determining the location of the external electronic device 104.

In an embodiment, the external electronic device 104 may store a transmission time (e.g., $T_1$) of the ranging initiation message and transmit the ranging initiation message to the electronic device 200. The electronic device 200, in response to receiving the ranging initiation message, may store a time (e.g., $T_2$) at which the ranging initiation message was received. According to another embodiment, the external electronic device 104 may transmit the ranging initiation message including the transmission time (e.g., $T_1$) of the ranging initiation message to the electronic device 200. The transmission time of the ranging initiation message may be transmitted to the electronic device 200, depending on a configuration of the electronic device 200 and the external electronic device 104.

According to various example embodiments, in operation 415, the electronic device 200 may transmit the ranging response message to the external electronic device 104 in response to receiving the ranging initiation message.

According to various example embodiments, the electronic device 200 may transmit the ranging response message and store the time (e.g., $T_3$) at which the ranging response message was transmitted.

According to various example embodiments, in operation 417, the external electronic device 104 may transmit the ranging final message to the electronic device 200 in response to receiving the ranging response message.

According to various example embodiments, the external electronic device 104 may store the time (e.g., $T_5$) at which the ranging final message was transmitted while transmitting the ranging final message.

According to various example embodiments, the electronic device 200 may store the time (e.g., $T_6$) at which the ranging final message was received while receiving the ranging final message.

According to various example embodiments, in operation 419, the external electronic device 104 may transmit the ranging final message and, after a specified time (e.g., slot duration), transmit the measurement report message to the electronic device 200.

According to various example embodiments, the measurement report message may include a round trip time RTT indicating a difference value between the reception time $T_4$ of the response message and the transmission time $T_1$ of the ranging initiation message, and/or a reply time indicating a difference value between the transmission time $T_5$ of the final message and the reception time $T_4$ of the response message. In another example, the measurement report message may include the transmission time $T_1$ of the ranging initiation message, the reception time $T_4$ of the response message, and/or the transmission time $T_5$ of the final message.

According to various example embodiments, the electronic device 200 may, in operation 420, determine the location between the external electronic device 104 and the electronic device 200 on the basis of the measurement report message. For example, the electronic device 200 may determine the distance between the external electronic device 104 and the electronic device 200 on the basis of a round-trip time and a response time included in the measurement report message. In another example, the electronic device 200 may determine the distance between the external electronic device 104 and the electronic device 200 on the basis of the transmission time $T_1$ of the ranging initiation message, the reception time $T_2$ of the ranging initiation message, the transmission time $T_3$ of the ranging response message, the reception time $T_4$ of the ranging response message, the transmission time $T_5$ of the ranging final message, and the reception time $T_6$ of the ranging final message. The electronic device 200 may determine the distance between the external electronic device 104 and the electronic device 200, on the basis of Equation 2 described above. Equation 2 may be an equation for calculating an average travel distance of the first signal (e.g., the ranging initiation message, the ranging response message, or the ranging final message), which is a set of signals exchanged in the first operation mode.

According to various example embodiments, the electronic device 200 and the external electronic device 104 may omit some of the operations 411, 413, 415, 417, or 419, depending on the location determination method configured through the UWB connection. According to an embodiment, the electronic device 200 and the external electronic device 104, when configured in a deferred mode and determining the location of the external electronic device 104 using double sided two way ranging (DS-TWR), may perform all of operations 411, 413, 415, 417, or 419 to determine the location of the external electronic device 104. According to another embodiment, the electronic device 200 and the external electronic device 104, when configured in the deferred mode and determining the location of the external electronic device 104 using single sided two way ranging (SS-TWR), may perform operation 411, 413, 415, 417, and/or 419 to determine the location of the external electronic device 104. According to another embodiment, the electronic device 200 and the external electronic device 104 may perform operation 411, 413, 415, 417, and/or 419 as the electronic device 200 and the external electronic device 104 are configured in a non-deferred mode (a mode in which time stamp information corresponding to the measured time is included in the ranging message (e.g., the control message, the ranging initiation message, the ranging response message, and/or the ranging final message) and transmitted).

According to various example embodiments, the electronic device 200 may switch from the first location determination mode to the second location determination mode in response to determining the location of the external electronic device 104.

According to an embodiment, the external electronic device 104 may switch to the second location determination mode after a specified time (e.g., ranging interval) included in the UWB parameter. The external electronic device 104 may transmit the second signal (e.g., a blink message) every specified time (e.g., a ranging interval included in the UWB parameter) and for the specified number of times (e.g., the number of iterations of the second location determination mode included in the UWB parameter) after the first location determination mode ends.

According to various example embodiments, in operation 431, the external electronic device 104 may transmit the second signal to the electronic device 200 after a specified time period 451.

According to various example embodiments, the location of the external electronic device 104 determined in the second location determination mode may be less accurate due to a clock error that may occur due to asynchronization between the electronic device 200 and the external electronic device 104. The electronic device 200 may determine the location of the external electronic device 104 in consideration of the clock error.

According to various example embodiments, the electronic device 200 may check an error in the determined distance between the electronic device 200 and the external electronic device 104 on the basis of a time stamp value of a message (e.g., the control message, the ranging initiation message, the ranging final message, or the measurement report message) received in the first location determination mode. During a time difference between the transmission time of the control message and the transmission time of the ranging start message, it may be assumed that there is no movement of the external electronic device 104. In case that there is no movement of the external electronic device 104, the distance between the electronic device 200 and the external electronic device 104 may remain the same. In case that the distance between the electronic device 200 and the external electronic device 104 is maintained, a difference between a time stamp value A of the control message and a time stamp value B of the ranging initiation message may be the same as a difference between time stamp values corresponding to the ranging final message and the measurement report message. In case of not being the same as the difference between the time stamp values corresponding to the ranging final message and the measurement report message, it may be that a clock error has occurred due to the asynchronization between the electronic device 200 and the external electronic device 104.

Hereinafter, an embodiment is described in which the electronic device 200 measures the location of the external electronic device 104, taking into account a clock error.

According to an embodiment, the electronic device 101/200 may check the difference between the time stamp value A of the control message 411 and the time stamp value B of the ranging initiation message 413, and check an error using the Equation 4 described below.

$$\text{Error} = TS_B - \left(TS_A + \frac{\text{slot duration}}{RTCU}\right) \quad \text{[Equation 4]}$$

(Error: error, TSB: time stamp value of ranging start message, TSA: time stamp value of control message, slot duration: difference between transmission time of ranging start message and transmission time of control message, RCTU: time interval between time stamps (e.g., 15.65 ps).

According to various example embodiments, the electronic device 200 may check an error on the basis of a difference between a time stamp value of the ranging final message and a time stamp value of the measurement report message, similar to Equation 4. The error determined in Equation 4 may be an error caused by the difference between the transmission time of the ranging initiation message and the transmission time of the control message. An error caused by the asynchronization of the clock between the electronic device 200 and the external electronic device 104 may be such that, as the time for measuring the location of the external electronic device 104 increases, the error may be accumulated, and a measurement of a location that takes the error into account may be required according to the embodiments described below.

According to various example embodiments, the electronic device 200 may check the amount of change in the location between the electronic device 200 and the external electronic device 104 on the basis of the difference and error between the time stamp of the first signal and the time stamp of the second signal. The amount of change in location may be determined using Equation 5 below.

$$\text{Amount of change in location} = s * \left[TS_{Blink} - \left(TS_{control} + N_{blink} * \left(\left(\frac{\text{ranging interval}}{RCTU}\right) + (\text{ranging interval} * \text{error})\right)\right)\right] \quad \text{[Equation 5]}$$

($TS_{Blink}$: time stamp number of second signal, $TS_{control}$: time stamp number of first signal, $N_{blink}$: number of times second signal is received, ranging interval: specified transmission time of second signal, RCTU: time unit of time stamp, s: travel distance of second signal during time unit of time stamp, error: error)

With reference to Equation 5, the electronic device 200 may determine the amount of change in the location of the external electronic device 104 in consideration of the error (e.g., clock error) accumulated during the time ($N_{blink}$ (corresponding to 1 in operation 431)*ranging interval (e.g., one second)) taken from receiving the control message to receiving the second signal.

According to various example embodiments, the electronic device 200 may determine (or update) the location of the external electronic device 104 in the second location determination mode on the basis of the amount of change in location and the location of the external electronic device 104 determined in the first location determination mode. Upon receiving the second signal every specified number of times, the processor 230 may determine (or update) the location of the external electronic device 104 in the manner described above. The second signal may indicate, in the second location measurement mode, a signal that the external electronic device 104 transmits to the electronic device 200 for determining the location of the external electronic device 104. The second signal may include time stamp information corresponding to the time at which the external electronic device 104 transmitted a signal.

According to various example embodiments, in operation 433, the external electronic device 104 may transmit the second signal to the electronic device 200 after a specified time period 452.

According to various example embodiments, the electronic device 200 may receive the second signal and determine the location of the external electronic device 104 on the basis of the second signal.

According to various example embodiments, in operation 435, the external electronic device 104 may transmit the second signal to the electronic device 200 after a specified time period 453.

According to various example embodiments, the electronic device 200 may receive the second signal and determine the location of the external electronic device 104 on the basis of the second signal.

According to various example embodiments, in operation 437, the external electronic device 104 may transmit the second signal to the electronic device 200 after a specified time period 454.

According to various example embodiments, the electronic device 200 may receive the second signal and determine the location of the external electronic device 104 on the basis of the second signal.

According to various example embodiments, while operating in the second location measurement mode, the electronic device 200 may determine the amount of change in the location of the external electronic device 104 using the Equation 5 described above. The electronic device 200 may determine the location of the external electronic device 104 on the basis of the amount of change in the location of the external electronic device 104 and the location of the external electronic device 104 determined in the first location measurement mode. Table 1 below describes the location of the external electronic device 104 as determined using Equation 5.

electronic device (e.g., the external electronic device 104 in FIG. 1) in the first location determination mode.

According to various example embodiments, the first location determination mode may indicate a mode in which the location of the external electronic device 104 may be determined on the basis of the first signals exchanged between the external electronic device 104 and the electronic device 200 (e.g., the control message, the ranging initiation message, the ranging response message, the ranging final message, and/or the measurement report message).

According to various example embodiments, the measurement report message may include a round trip time RTT indicating a difference value between the reception time $T_4$ of the response message and the transmission time $T_1$ of the ranging initiation message, and/or a reply time indicating a difference value between the transmission time $T_5$ of the final message and the reception time $T_4$ of the response message. In another example, the measurement report message may include the transmission time $T_1$ of the ranging initiation message, the reception time $T_4$ of the response message, and/or the transmission time $T_5$ of the final message.

The electronic device 200 may determine the distance between the external electronic device 104 and the electronic device 200 on the basis of a round-trip time and a response time included in the measurement report message. The distance between the external electronic device 104 and the electronic device 101/200 may be determined on the basis of the transmission time $T_1$ of the ranging initiation message, the reception time $T_2$ of the ranging initiation message, the transmission time $T_3$ of the response message, the reception time $T_4$ of the response message, the transmission time $T_5$ of the final message, and/or the reception time $T_6$ of the final message.

According to various example embodiments, the electronic device 200 may, in the first location determination mode, determine the location of the external electronic device 104, and then switch to the second location determination mode.

TABLE 1

| TS of second signal | Control message TS | Number of iterations of second signal | Ranging Interval (ms) | RCTU (ps) | Error (1 ms) | Time stamp difference value | Amount of change in location | location of external electronic device |
|---|---|---|---|---|---|---|---|---|
| 481405646644 | 417507863066 | 1 | 1000 | 15.65 | 20 | 0 | 0 | 150 cm |
| 545303430172 | 417507863066 | 2 | | | | −50 | −23.452 | 127 cm |
| 609201213645 | 417507863066 | 3 | | | | −155 | −72.700 | 77 cm |
| 673098997108 | 417507863066 | 4 | | | | −270 | −126.639 | 23 cm |

Figure 5:
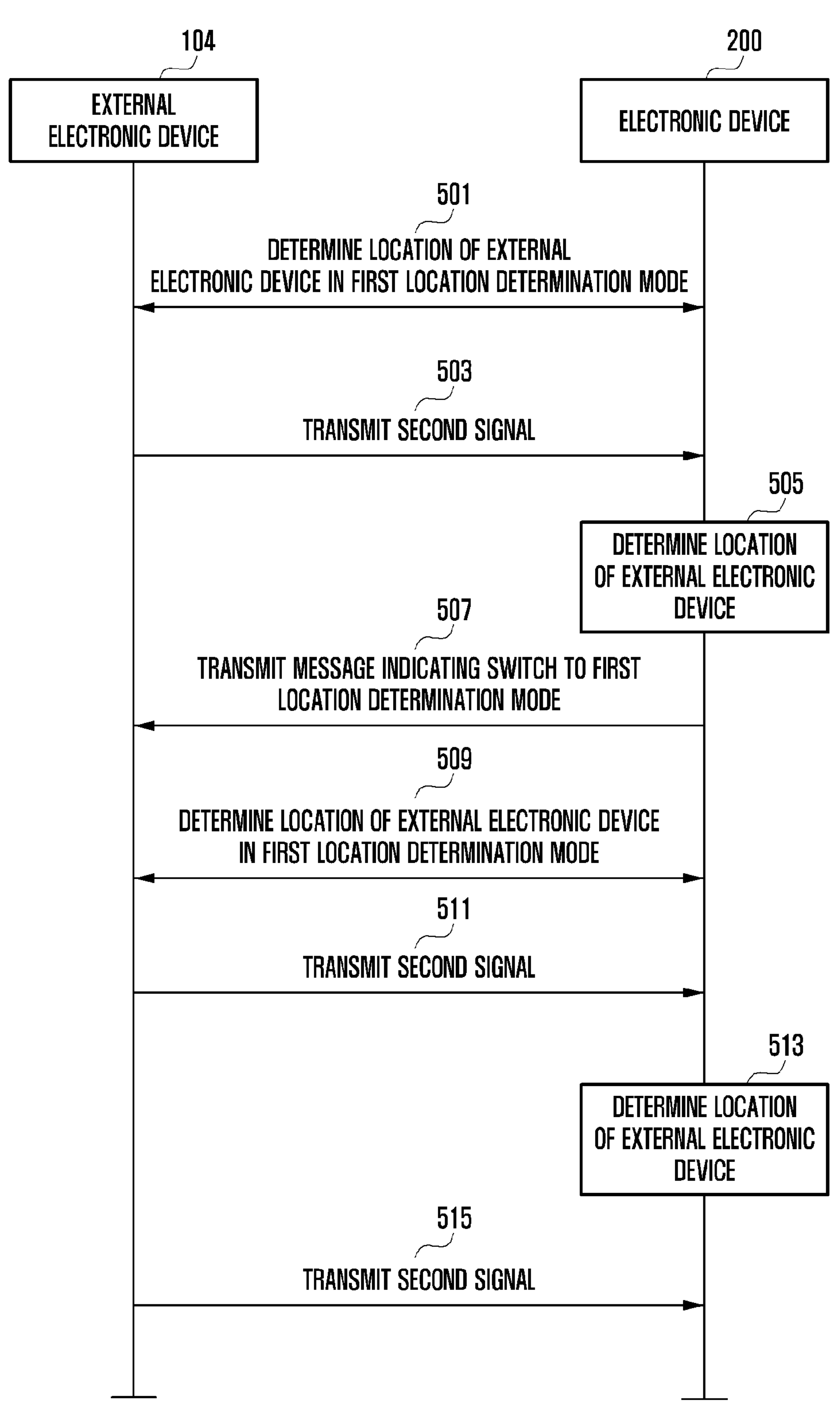
FIG. 5 is a view illustrating an embodiment in which the electronic device, according to various example embodiments, switches from the second location determination mode to the first determination mode in response to the location of the external electronic device satisfying a specified condition.

FIG. 5 is a view illustrating an embodiment in which the electronic device, according to various example embodiments, switches from the second location determination mode to the first determination mode in response to the location of the external electronic device satisfying a specified condition.

According to various example embodiments, the electronic device 200 may, while performing the UWB connection, exchange the UWB parameter through communication methods other than UWB communication (out of band, OOB) (e.g., short-range communication methods including Bluetooth or Wi-Fi). The electronic device 200 may exchange the UWB parameter through another communication method (OOB) connected between the external electronic device 104 and the electronic device 200.

According to various example embodiments, an electronic device (e.g., the electronic device 200 in FIG. 2) may, in operation 501, determine the location of the external electronic device (e.g., the external electronic device 104 in FIG. 1) in the first location determination mode, determine the location of the external electronic device 104, and then switch to the second location determination mode.

According to various example embodiments, the second location determination mode may be a location determination mode in which the location of the external electronic device 104 may be determined on the basis of the second signal transmitted by the external electronic device 104 to the electronic device 200. The second location determination mode may be a mode in which the external electronic device 104 transmits the second signal every specified time and the electronic device 200 may not transmit a separate signal from the external electronic device 104. Since the number of signals transmitted and/or received is smaller than in the first location determination mode, it is possible to operate with a smaller power consumption than in the first location determination mode.

According to various example embodiments, the external electronic device 104, in operation 503, may transmit the second signal (e.g., a blink message) every specified time (e.g., a ranging interval included in the UWB parameter) and for the specified number of times (e.g., the number of iterations of the second location determination mode included in the UWB parameter).

According to various example embodiments, the electronic device 200, operation 505, may determine the location of the external electronic device 104 on the basis of the second signal.

According to various example embodiments, the electronic device 200 may check a time stamp of the first signal received in the first location determination mode (e.g., the control message) and a time stamp of the second signal received in the second location determination mode. The electronic device 200 may check the amount of change in location between the electronic device 200 and the external electronic device 104 on the basis of a difference in the time stamp of the first signal and the time stamp of the second signal. The electronic device 200 may determine (or update) the location of the external electronic device 104 in the second location determination mode on the basis of the amount of change in location and the location of the external electronic device 104 determined in the first location determination mode.

According to various example embodiments, the electronic device 200 may switch from the second location determination mode to the first location determination mode in response to satisfying a condition that the location of the external electronic device 104 is specified.

According to an embodiment, the electronic device 200 may determine the amount of change in the location of the external electronic device 104 while operating in the second mode of operation. The electronic device 200 may switch from the second location determination mode to the first location determination mode in response to checking that the amount of change in the location of the external electronic device 104 is greater than or equal to a specified value.

According to an embodiment, the electronic device 200 may switch from the second location determination mode to the first location determination mode in response to checking that the distance between the electronic device 200 and the external electronic device 104 is greater than or equal to a specified value while operating in the second operation mode.

According to various example embodiments, the electronic device 200 may check a parameter that may be obtained during the establishment of the UWB communication or in a step of exchanging the control message of the first operation mode, and may check information on a condition for switching from the second operation mode within the parameter to the first operation mode. The electronic device 200 may configure a condition related to a switch from the second operating mode to the first operating mode, on the basis of information on the condition of the switch from the second operating mode to the first operating mode.

According to various example embodiments, in operation 507, the electronic device 200 may transmit information indicating the switch from the second mode of operation to the first mode of operation to the external electronic device 104 through various communication methods established between the electronic device 200 and the external electronic device 104 (e.g., UWB communication, OOB communication other than UWB communication (Wi-Fi, Bluetooth)) in response to a condition related to the reception of the second signal satisfying a specified condition.

According to various example embodiments, the electronic device 200 may determine the location of the external electronic device 104 in the first location determination mode, in operation 509.

According to various example embodiments, the electronic device 200 may, in the first location determination mode, determine the location of the external electronic device 104, and then switch to the second location determination mode.

According to various example embodiments, the external electronic device 104, in operation 511, may transmit the second signal (e.g., a blink message) every specified time (e.g., a ranging interval included in the UWB parameter) and for the specified number of times (e.g., the number of iterations of the second location determination mode included in the UWB parameter). The second signal may indicate, in the second location measurement mode, a signal that the external electronic device 104 transmits to the electronic device 200 for determining the location of the external electronic device 104. The second signal may include time stamp information corresponding to the time at which the external electronic device 104 transmitted a signal.

According to various example embodiments, the electronic device 200, operation 513, may determine the location of the external electronic device 104 on the basis of the second signal.

According to various example embodiments, the electronic device 200 may maintain the second location determination mode in response to the location of the external electronic device 104 not satisfying a specified condition.

According to various example embodiments, the external electronic device 104, in operation 511/515, may transmit the second signal (e.g., a blink message) every specified time (e.g., a ranging interval included in the UWB parameter) and for the specified number of times (e.g., the number of iterations of the second location determination mode included in the UWB parameter).

According to various example embodiments, the electronic device 200, operation 513, may determine the location of the external electronic device 104 on the basis of the second signal.

According to various example embodiments, the electronic device 200 may change a period of switching from the second location determination mode to the first location determination mode. According to an embodiment, the electronic device 200 may change the period of switching from the second location determination mode to the first location determination mode by adjusting the number of times the second signal is transmitted in the second location determination mode and/or a period of transmission of the second signal. The electronic device 200 may monitor the location of the external electronic device 104 that is determined in the second location determination mode and, in case that the location of the external electronic device 104 has an amount of change within a specified range, increase the number of times the second signal is transmitted, and/or increase the period of transmission of the second signal, thereby causing the electronic device 200 to operate in the second location determination mode for a relatively longer period of time. In the manner described above, the power consumption of the electronic device 200 and the external electronic device 104 may be further reduced. The electronic device 200 may monitor the location of the external electronic device 104 that is determined in the second location determination mode and, in case that the location of the external electronic device 104 has an amount of change above a specified range, decrease the number of times the second signal is transmitted, and/or decrease the period of transmission of the second signal, thereby causing the electronic device 200 to operate in the second location determination mode for a relatively shorter period of time. The electronic device 200 may increase the number of times the second signal is transmitted, and/or increase the period of transmission of the second signal, in response to state information on the electronic device 200 satisfying a specified condition (e.g., a condition in which a movement of the electronic device 200 has a movement within a specified range, a condition in which a display of the electronic device 200 is in an inactive state), thereby causing the electronic device 200 to operate in the second location determination mode for a relatively longer period of time. In the manner described above, the power consumption of the electronic device 200 and the external electronic device 104 may be further reduced.

The electronic device according to various example embodiments includes: a communication circuit for transmitting or receiving data through communication using an ultra-wideband (UWB); and a processor, wherein the processor may be configured to: check a parameter for measuring a location of an external electronic device while establishing the communication for measuring the location of the external electronic device; operate in a first location determination mode for determining, on the basis of the parameter, a location of the external electronic device on the basis of first signals exchanged between the external electronic device and the electronic device; in response to determining the location of the external electronic device, switch to a second location determination mode for determining a location of the external electronic device on the basis of a second signal transmitted by the external electronic device; and in response to satisfying a specified condition related to the location of the external electronic device, switch from the second location determination mode to the first location determination mode.

The electronic device according to various example embodiments, the processor may be configured to switch from the second location determination mode to the first location determination mode in response to a number of receptions of the second signal being a specified number of times.

The electronic device according to various example embodiments, the processor may be configured to check a location of the electronic device and a location of the external electronic device determined in the second location determination mode, and to switch from the second location determination mode to the first location determination mode in response to a distance between the external electronic device and the electronic device satisfying a specified condition.

The electronic device according to various example embodiments, the processor may be configured to switch from the second location determination mode to the first location determination mode in response to an amount of change in location of the external electronic device satisfying a specified condition.

The electronic device according to various example embodiments, the processor may be configured to transmit a message indicating a switch from the second location determination mode to the first location determination mode to the external electronic device through other communication methods.

The electronic device according to various example embodiments, the processor may be configured to not switch to the second location determination mode in response to not determining a location of the external electronic device in the first location determination mode.

The electronic device according to various example embodiments, the processor may check a switching condition of the second location determination mode included in the parameter, and configure the specified condition on the basis of the switching condition of the second location determination mode.

In the electronic device according to various example embodiments, the processor may be configured to, in the first location determination mode, determine a distance between the electronic device and the external electronic device on the basis of the first signal, determine, in the second location determination mode, an amount of change in the distance between the electronic device and the external electronic device, and determine, in the second location determination mode, an amount of change in the distance and a distance between the electronic device and the external electronic device on the basis of the distance.

In the electronic device according to various example embodiments, the processor may be configured to determine, in the first location determination mode, an error in the determined distance between the electronic device and the external electronic device on the basis of a specified time interval between first signals received from the external electronic device and a difference in reception times of the first signals, and to determine an amount of change in the distance on the basis of the error, the specified time interval between the second signals, and the reception times of the second signals.

In the electronic device according to various example embodiments, the processor may be configured to receive, in the first location determination mode, the parameter from the external electronic device.

Figure 6:
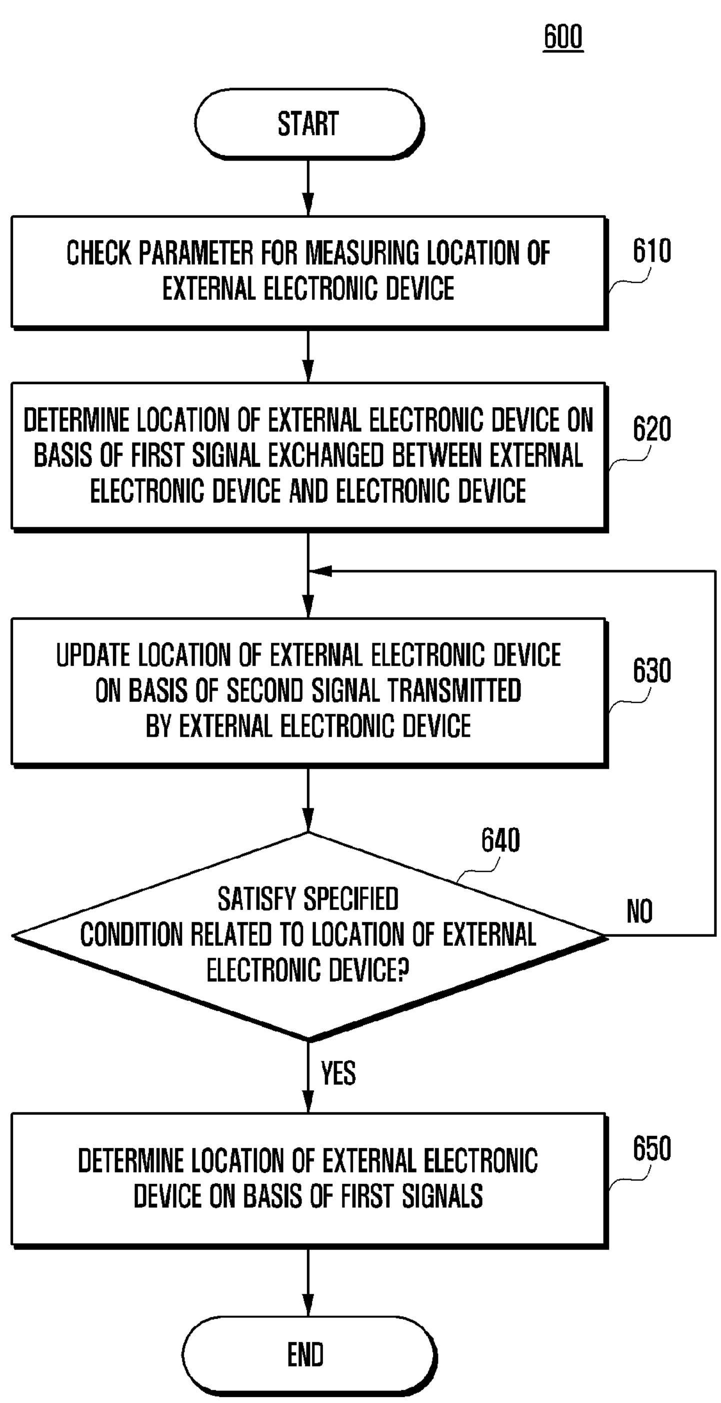
FIG. 6 is an operational flowchart illustrating a method of operating the electronic device according to various example embodiments.

FIG. 6 is an operational flowchart illustrating a method 600 of operating the electronic device according to various example embodiments.

According to various example embodiments, in operation 610, the electronic device (e.g., the electronic device 200 in FIG. 2) may check a parameter for determining a location of the external electronic device (e.g., the external electronic device 104 in FIG. 1).

According to various example embodiments, the electronic device 200 may exchange a parameter for the UWB communication connection with the external electronic device 104 during the establishment of the UWB communication connection with the external electronic device 104. The processor 230 may exchange the parameter through UWB communication or other communication methods (out of band, OOB) (e.g., short-range communication methods including Bluetooth or Wi-Fi). For example, the parameter may include information indicating whether the first location determination mode and the second location determination mode are operated, the number of times the second location determination mode is operated, and information on conditions for switching from the second location determination mode to the first location determination mode.

According to various example embodiments, in operation 620, the electronic device 200 may determine the location of the external electronic device 104 on the basis of the first signals, in the first location determination mode, after the UWB communication connection is completed.

According to various example embodiments, the electronic device 200 may determine the location of the external electronic device 104 on the basis of the first signals exchanged between the external electronic device 104 and the electronic device 200 (e.g., the control message, the ranging initiation message (or polling message), the ranging response message, the ranging final message, and/or the measurement result report message) in response to determining the location of the external electronic device 104.

According to various example embodiments, the electronic device 200 may switch from the first location determination mode to the second location determination mode in response to the completion of the location determination of the external electronic device 104. The external electronic device 104 also may switch to the second location determination mode after a specified time (e.g., ranging interval) included in the UWB parameter.

According to various example embodiments, the second location determination mode may be a location determination mode in which the location of the external electronic device 104 may be determined on the basis of the second signal transmitted by the external electronic device 104 to the electronic device 200. The second location determination mode may be a mode in which the external electronic device 104 transmits the second signal every specified time and the electronic device 200 may not transmit a separate signal from the external electronic device 104. Since the number of signals transmitted and/or received is smaller than in the first location determination mode, it is possible to operate with a smaller power consumption than in the first location determination mode.

According to various example embodiments, the external electronic device 104 may transmit the second signal (e.g., a blink message) every specified time (e.g., a ranging interval included in the UWB parameter) and for the specified number of times (e.g., the number of iterations of the second location determination mode included in the UWB parameter) after the first location determination mode ends.

According to an embodiment, the second signal may include a blink message. The second signal may indicate, in the second location measurement mode, a signal that the external electronic device 104 transmits to the electronic device 200 for determining the location of the external electronic device 104. The second signal may include time stamp information corresponding to the time at which the external electronic device 104 transmitted a signal. A configuration related to the transmission of the second signal (e.g., a specified time related to a transmission period of the second signal and/or a specified number of times related to the transmission of the second signal) may be configured in the operation of configuring the UWB connection between the electronic device 200 and the external electronic device 104, prior to operation 610.

According to various example embodiments, in operation 630, the electronic device 200 may update the location of the external electronic device on the basis of the second signal transmitted by the external electronic device 104.

The electronic device 200 may receive the second signal transmitted by the external electronic device 104, and check the reception time of the second signal. The electronic device 200 may check the amount of change in location between the external electronic device 104 and the electronic device 200 on the basis of a specified time and the time of reception of the second signal. The electronic device 200 may update the location of the external electronic device 104 on the basis of the amount of change in the location and the location information of the external electronic device 104 determined in the first location determination mode. Upon receiving the second signal every specified number of times, the electronic device 200 may determine (or update) the location of the external electronic device 104 in the manner described above.

According to various example embodiments, in operation 640, the electronic device 200 may check whether the specified condition related to the location of the external electronic device 104 is satisfied.

According to various example embodiments, the electronic device 200 may switch from the second location determination mode to the first location determination mode in response to satisfying a condition that the location of the external electronic device 104 is specified.

According to an embodiment, the electronic device 200, while operating in the second operation mode, may check a number of times the second signal is received and switch from the second location determination mode to the first location determination mode in response that the number of times the second signal is received satisfies the specified condition.

According to an embodiment, the electronic device 200 may determine the amount of change in the location of the external electronic device 104 while operating in the second mode of operation. The electronic device 200 may switch from the second location determination mode to the first location determination mode in response to checking that the amount of change in the location of the external electronic device 104 is greater than or equal to a specified value.

According to an embodiment, the electronic device 200 may switch from the second location determination mode to the first location determination mode in response to checking that the distance between the electronic device 200 and the external electronic device 104 is greater than or equal to a specified value while operating in the second operation mode.

According to various example embodiments, the electronic device 200 may transmit information indicating the switch from the second mode of operation to the first mode of operation to the external electronic device 104 through various communication methods established between the electronic device 200 and the external electronic device 104 (e.g., UWB communication, OOB communication other than UWB communication (Wi-Fi, Bluetooth)) in response to a condition related to the reception of the second signal satisfying a specified condition.

According to various example embodiments, in operation 650, the electronic device 200 may determine the location of the external electronic device 104 on the basis of the first signal.

An operation method of an electronic device according to various example embodiments, the operation method including: checking a parameter for measuring a location of an external electronic device while establishing communication for measuring the location of the external electronic device; determining a location of the external electronic device, on the basis of the parameter, while operating in a first location determination mode for determining a location of the external electronic device on the basis of first signals exchanged between the external electronic device and the electronic device; switching to a second location determination mode for determining a location of the external electronic device on the basis of a second signal transmitted by the external electronic device, and updating the location of the external electronic device; and switching from the second location determination mode to the first location determination mode in response to satisfying a specified condition related to the location of the external electronic device.

In the operation method of the electronic device according to various example embodiments, the switching to the first location determination mode may include switching from the second location determination mode to the first location determination mode in response that a number of times the second signal is received is a specified number of times.

In the operation method of the electronic device according to various example embodiments, the switching to the first location determination mode may include: checking the location of the electronic device and the location of the external electronic device determined in the second location determination mode; and switching from the second location determination mode to the first location determination mode in response to a distance between the external electronic device and the electronic device satisfying a specified condition.

In the operation method of the electronic device according to various example embodiments, the switching to the first location determination mode comprises switching from the second location determination mode to the first location determination mode in response to an amount of change in location of the external electronic device satisfying a specified condition.

In the operation method of the electronic device according to various example embodiments, the operation method may further include transmitting a message indicating a switch from the second location determination mode to the first location determination mode to the external electronic device through other communication methods.

In the operation method of the electronic device according to various example embodiments, the operation method may further include, in the first location determination mode, maintaining the first location determination mode without switching to the second location determination mode in response to not determining the location of the external electronic device.

In the operation method of the electronic device according to various example embodiments, the operation method may further include: checking a switching condition of the second location determination mode included in the parameter; and configuring the specified condition based on the switching condition of the second location determination mode. "Based on" as used herein covers based at least on.

In the operation method of the electronic device according to various example embodiments, the operation method may further include: in the first location determination mode, determining a distance between the electronic device and the external electronic device on the basis of the first signal; in the second location determination mode, determining an amount of change in the distance between the electronic device and the external electronic device; and in the second location determination mode, determining a distance between the electronic device and the external electronic device on the basis of the amount of change in the distance and the distance.

In the operation method of the electronic device according to various example embodiments, the determining of the amount of change in the distance may further include: determining in the first location determination mode, an error in the determined distance between the electronic device and the external electronic device on the basis of a specified time interval between first signals received from the external electronic device and a difference in reception times of the first signals; and determining a change in the distance on the basis of the error, the specified time interval between the second signals, and the reception times of the second signals.

In the operation method of the electronic device according to various example embodiments, the checking of the parameter may further receiving, in the first location determination mode, the parameter from the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment (s) described herein may be used in conjunction with any other embodiment(s) described herein.

The invention claimed is:

1. An electronic device comprising:

a communication circuit configured to perform data transmission and/or reception via an ultra-wide band (UWB); and at least one processor, wherein the at least one processor, individually and/or collectively, is configured to:

determine a first distance between the electronic device and an external electronic device based on first signals exchanged between the external electronic device and the electronic device while the electronic device operates in two-way ranging mode;

switch from the two-way ranging mode to a one-way ranging mode in response to determining the first distance between the electronic device and the external electronic device;

receive, from the external electronic device, second signals while the electronic device operates in the one-way ranging mode for determining an amount of change of distance between the electronic device and the external electronic device;

determine a second distance between the electronic device and the external electronic device based on the first distance and the amount of change of the distance; and switch from the one-way ranging mode to the two-way ranging mode in response to determining that a specified condition related to distance between the electronic device and the external electronic device is satisfied.

2. The electronic device of claim 1, wherein the at least one processor, individually and/or collectively, is configured to switch from the one-way ranging mode to the two-way ranging mode in response to a number of receptions of the second signals being a specified number of times.

3. The electronic device of claim 1, wherein the at least one processor, individually and/or collectively, is configured to:

switch from the one-way ranging mode to the two-way ranging mode based on that the second distance between the electronic device and the external electronic device is more than a specified value.

4. The electronic device of claim 1, wherein the at least one processor, individually and/or collectively, is configured to switch from the one-way ranging mode to the two-way ranging mode based on that an amount of change in distance between the electronic device and the external electronic device is more than a specified value.

5. The electronic device of claim 4, wherein the at least one processor, individually and/or collectively, is configured to control to transmit a message indicating a switch from the one-way ranging mode to the two-way ranging mode to the external electronic device.

6. The electronic device of claim 1, wherein the at least one processor, individually and/or collectively, is configured to not switch to the one-way ranging mode when the first distance between the electronic device and the external electronic device is not determined while the electronic device operates in the two-way ranging mode.

7. The electronic device of claim 1, wherein the at least one processor, individually and/or collectively, is configured to check a switching condition of the one-way ranging mode, and configure the specified condition based on the switching condition of the one-way ranging mode.

8. The electronic device of claim 1, wherein the at least one processor, individually and/or collectively, is configured to:

in the two-way ranging mode, determine the first distance between the electronic device and the external electronic device based on the first signals, determine, in the one-way ranging mode, an amount of change in a distance between the electronic device and the external electronic device, and determine, in the one-way ranging mode, the second distance between the electronic device and the external electronic device based on the amount of change in the distance and the first distance between the electronic device and the external electronic device.

9. The electronic device of claim 8, wherein the at least one processor, individually and/or collectively, is configured to:

determine, in the two-way ranging mode, an error in the first distance between the electronic device and the external electronic device based on a specified time interval between first signals received from the external electronic device and a difference in reception times of the first signals, and determine the amount of change in the distance based on the error, the specified time interval between the second signals, and the reception times of the second signals.

10. An operation method of an electronic device, the method comprising:

determining a first distance between the electronic device and an external electronic device based on first signals exchanged between the external electronic device and the electronic device while the electronic device operates in a two-way ranging mode;

switching from the two-way ranging mode to a one-way ranging mode in response to determining the first distance between the electronic device and the external electronic device;

receiving, from the external electronic device, second signals while the electronic device operates in the one-way ranging mode for determining an amount of change of distance between the electronic device and the external electronic device;

determining a second distance between the electronic device and the external electronic device based on the first distance and the amount of change of the distance; and switching from the one-way ranging mode to the two-way ranging mode in response to determining that that a specified condition related to distance between the electronic device and the external electronic device is satisfied.

11. The operation method of claim 10, wherein the switching to the two-way ranging mode comprises switching from the one-way ranging mode to the two-way ranging mode in response to a number of times the second signal is received reaching a specified number of times.

12. The operation method of claim 10, wherein the switching from the one-way ranging mode to the two-way ranging mode comprises:

switching from the one-way ranging mode to the two-way ranging mode based on the second distance between the external electronic device and the electronic device is more than a specified value.

13. The operation method of claim 10, wherein the switching to the two-way ranging mode comprises switching from the one-way ranging mode to the two-way ranging mode based on that an amount of change in the distance between the electronic device and the external electronic device is more than a specified value.

14. The operation method of claim 13, further comprising transmitting a message indicating a switch from the one-way ranging mode to the two-way ranging mode to the external electronic device.

* * * * *